(12) United States Patent
Rieger

(10) Patent No.: US 7,924,506 B2
(45) Date of Patent: Apr. 12, 2011

(54) HEAD-MOUNTED DISPLAY SYSTEM

(75) Inventor: Robby Rieger, Karlsbad (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 12/118,661

(22) Filed: May 9, 2008

(65) Prior Publication Data

US 2008/0278821 A1 Nov. 13, 2008

(30) Foreign Application Priority Data

May 9, 2007 (EP) .................................. 07009326

(51) Int. Cl.
*G02B 27/14* (2006.01)
*G02B 23/00* (2006.01)
(52) U.S. Cl. ...................... 359/630; 359/407
(58) Field of Classification Search .......... 359/409–410, 359/462, 466, 638–639, 13–14, 603–636, 359/404, 407; 345/7, 9; 348/115; 353/11–12, 353/28, 119; 349/11; 340/438, 980, 995.1, 340/815.47, 815.74
See application file for complete search history.

(56) References Cited

U.S. PATENT DOCUMENTS

| 6,046,712 | A | * | 4/2000 | Beller et al. | 345/8 |
|---|---|---|---|---|---|
| 6,560,029 | B1 | * | 5/2003 | Dobbie et al. | 359/631 |
| 7,180,476 | B1 | * | 2/2007 | Guell et al. | 345/7 |
| 2005/0168569 | A1 | | 8/2005 | Igarashi et al. | |
| 2006/0055639 | A1 | | 3/2006 | Yamada | |
| 2006/0238877 | A1 | * | 10/2006 | Ashkenazi et al. | 359/630 |
| 2009/0040296 | A1 | * | 2/2009 | Moscato | 348/53 |

FOREIGN PATENT DOCUMENTS

| DE | 1 804 431 | 6/1971 |
|---|---|---|
| EP | 0 511 154 A2 | 10/1992 |
| EP | 1 168 033 A1 | 1/2002 |

\* cited by examiner

*Primary Examiner* — Ricky L Mack
*Assistant Examiner* — Dawayne A Pinkney
(74) *Attorney, Agent, or Firm* — The Eclipse Group LLP

(57) ABSTRACT

A head-mounted display system is provided. According to one example of an implementation, the head-mounted display system includes at least one sensor detecting surrounding information, a processing unit processing the surrounding information received from the at least one sensor, a display control unit generating display information to be displayed to a user of the system from the processed surrounding information received from the processing unit, and a head-mounted display capable of displaying information received from the display control unit to the user.

30 Claims, 4 Drawing Sheets

HEAD-MOUNTED DISPLAY SYSTEM

RELATED APPLICATIONS

This application claims priority of European Patent Application Serial Number 07 009 326.5, filed on May 9, 2007, titled HEAD-MOUNTED DISPLAY SYSTEM, which application is incorporated in its entirety by reference in this application.

BACKGROUND OF THE INVENTION

1. Field of the Invention

The inventions relates to a display system, and in particular, a head mounted display system capable of allowing individuals to view the environment surrounding the individual or the environment surrounding the vehicle in which the individual is located.

2. Related Art

In conventional vehicles, for example automobiles, cars and trucks, the driver of the vehicle steering the vehicle in general observes the environment surrounding the vehicle mainly by looking out from the inside of the vehicle to the outside through the windshield, side windows, and the rear window of the vehicle, either directly or indirectly by rear view mirrors. This causes a lot of problems.

First, the view out of the windows may be obstructed by structural parts of the vehicle, for example a pillar, window frames, head rests, or occupants of the vehicle, or may be degraded by rain or snow causing reflections especially at night or by oncoming light from the sun or from headlights of other vehicles. Additionally, certain areas in the surrounding of the vehicle, the so called blind angles, are hardly observable by the driver by using only the rear view mirrors without turning the head to the rear direction of the vehicle. Furthermore, in a conventional vehicle the driver has to observe several displays of the vehicle, for example a tachometer, control and warning lights, a navigation system, a radio system, and a mobile phone. This causes the driver in a conventional vehicle to direct his view away from the main driving direction into the direction of these displays increasing the danger of an accident.

Furthermore, also a rider of a motorbike or a bicycle suffers from problems mentioned above, e.g., observing the rear of the bike, monitoring displays of the bike, and retrieving information from a navigation system. Finally, also a hiker or a tourist visiting a city or the like, currently faces the problem, when using a mobile navigation device, that he/she has to hold the navigation device in his/her hands and does not pay attention to the way or path he/she is walking, when looking at the navigation device.

A need therefore exists for a display system that provides for the person, or user of a vehicle, to be able to view his or her surroundings without requiring the individual's line of sight to be diverted from his or her main direction of movement.

SUMMARY

A head-mounted display system is provided. According to one example of an implementation, the head-mounted display system includes at least one sensor detecting surrounding information, a processing unit processing the surrounding information received from the at least one sensor, a display control unit generating display information to be displayed to a user of the system from the processed surrounding information received from the processing unit, and a head-mounted display capable of displaying information received from the display control unit to the user.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
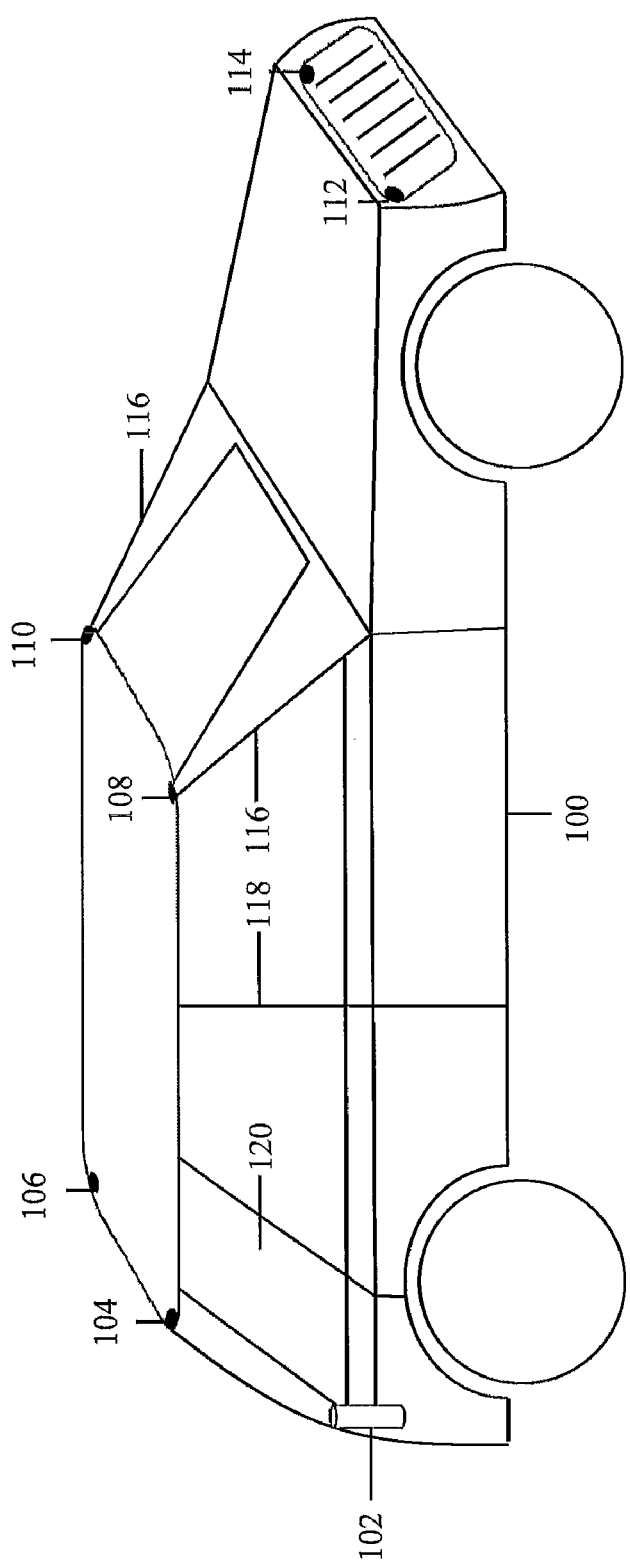
FIG. 1 is a perspective view of a vehicle provided with one example of an implementation of a head-mounted display system.

FIG. 1 illustrates a perspective view of a vehicle 100 provided with one example of an implementation of a head-mounted display system. As illustrated, the head-mounted display system includes several sensors 102, 104, 106, 108, 110, 112, 114 detecting surrounding information from the surrounding of the vehicle 100. The sensors may be cameras, night vision devices, ultrasonic devices, and/or radar devices capable of detecting the surrounding and environment of the vehicle 100 for generating display information to be displayed to an occupant of the vehicle 100.

The sensors 102, 104, 106, 108, 110, 112, 114 are located outside the vehicle 100 so that the views of the sensors 102, 104, 106, 108, 110, 112, 114 are not obstructed by structural elements of the vehicle itself, such as, for example, an A-column 116, a B-column 118, a C-column 120, and head rests (not shown), or occupants of the vehicle (not shown). Additionally, the sensors 102, 104, 106, 108, 110, 112, 114 are located at several positions on the vehicle 100, for example, the rooftop at the front side 108, 110 and the roof top at the back side 104, 106 of the vehicle 100 and near the bumpers at the front side 112, 114 and the backside 102 of the vehicle 100. As such, the sensors 102, 104, 106, 108, 110, 112, 114 are capable of detecting surrounding information around the entire vehicle 100 having no death angles.

As will be further described later, from the detected surrounding information detected by the sensors 102, 104, 106, 108, 110, 112, 114, display information for the occupants of the vehicle 100 is generated. Display information may then be displayed via head-mounted displays to the occupants.

Figure 2:
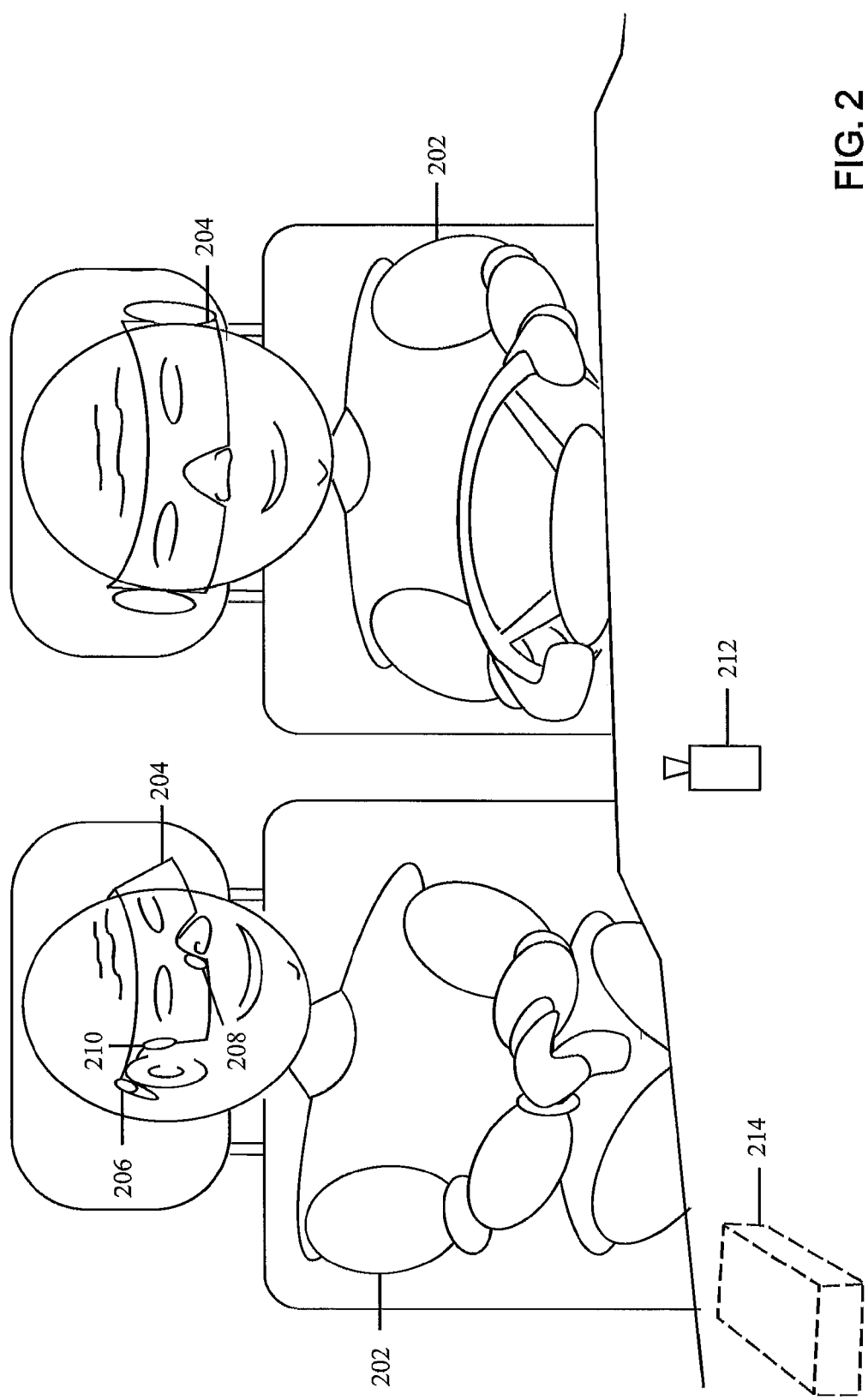
FIG. 2 is a schematic view of two occupants of a vehicle each wearing one example of an implementation of a head-mounted display of a head-mounted display system.

FIG. 2 is a schematic view of two occupants 202 seated in a vehicle 100 (FIG. 1), each wearing one example of an implementation of a head-mounted display 204. The head-mounted display 204 is a device that is worn by the occupant or user like spectacles, but instead of having transparent spectacle glasses in front of the eyes of the user wearing the device, the head-mounted display 204 provides a display projecting display information as visual information to the eyes of the user wearing the head-mounted display 204. The head-mounted display 204 provides two separate displays, each projecting the display information into each eye of the occupant for achieving a stereoscopic effect. As an alternative, a continuous display or display foil may be provided at the head-mounted display side opposite the eyes of the user wearing the head-mounted display 204 for displaying the display information.

As shown in FIG. 2, according to one implementation, a wireless connection to the head-mounted display 204 is provided that enables the wearing of the head-mounted display 204 without wires interfering with the movements of the occupant. Accordingly, and for example, a radio frequency transceiver 206 is may be provided within the head-mounted display 204 for wirelessly receiving display information to be displayed via the head-mounted display 204.

Additionally, the head-mounted display 204 may be provided with a microphone 208 and a loudspeaker 210. The audio signal received by the microphone 208 and output by the loudspeaker 210 may then also be transmitted via the radio frequency transceiver 206.

A line of sight sensor 212, which may be a camera observing the head movements of the occupants, is provided for detecting a line of sight of a driver of the vehicle and additional, or alternatively, line of sight sensors (not shown) for detecting a line of sight of the driver by observing the eye movement located inside the head-mounted display 204 may be provided to accurately detect the line of sight of the driver. A radio frequency transceiver 214 located, for example, in the dash board of the vehicle 100 and the transceiver 206 may be utilized for transmitting and receiving audio data, display information and line of sight information to and from the head-mounted display 204.

Figure 3:
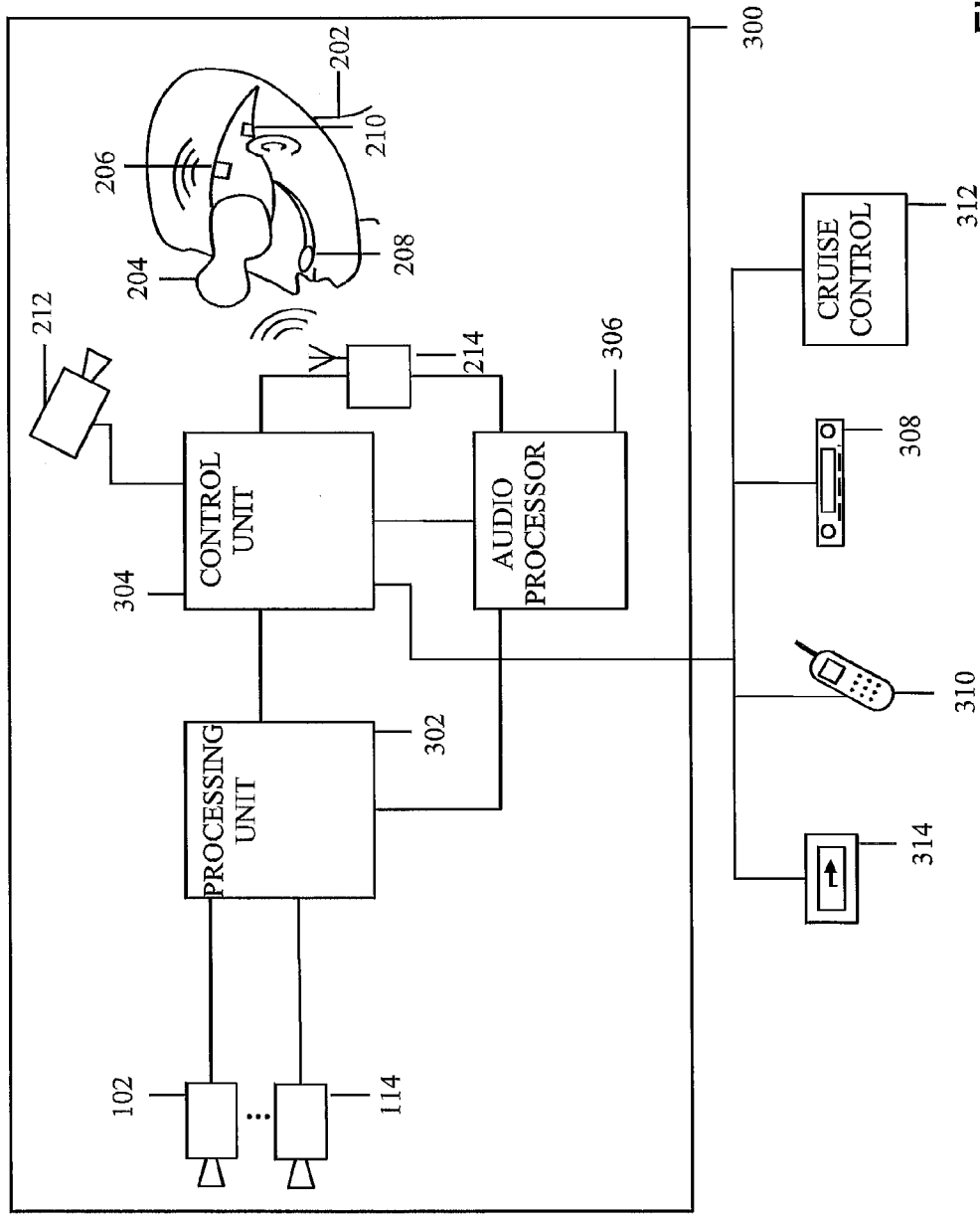
FIG. 3 is an example of a block diagram of one implementation of components of a head-mounted display system.

FIG. 3 is an example of a block diagram of one implementation of components of a head-mounted display system. With particular reference to FIG. 3, an example operation of the head-mounted display system 300 provided in the vehicle 100 (FIG. 1) is described. The head-mounted display system 300 includes one or more sensors 102, 104, 106, 108, 110, 112, 114 for detecting surrounding information from the surrounding of the vehicle, a processing unit 302 processing the surrounding information received from the sensor 102, a display control unit 304 generating display information to be displayed to an occupant 202 of the vehicle 100 from the processed surrounding information received from the processing unit 302, and a head-mounted display 204 displaying the display information received from the display control unit 304 to the occupant 202. The connection between the display control unit 304 and the head-mounted display 204 may be accomplished by a radio frequency transmission via a radio frequency transceiver 214 connected to the display control unit 304 and a radio frequency transceiver 206 built into the head-mounted display 204. As an alternative, an infra red transmission or a wired connection may be used connecting the head-mounted display 204 to the display control unit 304.

The sensors 102, 104, 106, 108, 110, 112, 114, which may be for example cameras, radar devices, night vision devices, and/or ultrasonic sensing devices, detect the environment surrounding the vehicle and provide the surrounding information to the processing unit 302. The processing unit 302 processes the surrounding information received from the sensors 102, 104, 106, 108, 110, 112, 114 such that, especially in case of several sensors 102, 104, 106, 108, 110, 112, 114, processed surrounding information is generated containing a combination of the surrounding information detected, i.e., for example a 360° view all around the vehicle comprising information detected by cameras combined with additional information retrieved from the ultrasonic sensing devices and the night vision devices. Furthermore, the processing unit 302 provides an image improvement processing of the detected surrounding information by, for example generating a dimmed visual output information from the detected surrounding information in the case of oncoming lights from oncoming cars or blinding sunlight at dusk or dawn. This allows for the generation of visual output information with increased contrast in case of fog or twilight, with reduced reflections at rainy weather or a wet road surface, and/or with increased brightness at night, or a combination thereof.

Next, the processed surrounding information is transmitted to the display control unit 304, which generates display information to be displayed to an occupant of the vehicle. In one example of an implementation, the transmission of the display information to the head-mounted display 204 displaying the information to the occupant is accomplished by a wireless transmission through a transceiver 214 connected to the display control unit 304 and a transceiver 206 incorporated in the head-mounted display 204 the occupant 202 is wearing. The display control unit 304 transmits adapted display information to the occupant 202. This adaptation includes, for example, presenting the occupant 202 with a viewing section corresponding to a current line of sight of the occupant. Therefore, the line of sight may be detected for example by a line of sight sensor 212, which may be a camera mounted inside the vehicle monitoring the occupant's head to determine the line of sight of the occupant, and may additionally, or alternatively, provide an eye movement sensor or camera incorporated into the head-mounted display 204 detecting the current line of sight of the eyes of the occupant relative to the head-mounted display 204. The information from the line of sight sensor incorporated in the head-mounted display 204 may also be transmitted via the wireless transmission between the transceivers 206 and 214 to the display control unit 304. Combining the information from the line of sight sensor 212 within the compartment of the vehicle and the line of sight sensor incorporated in the head-mounted display 204, the display control unit 304 may provide display information adapted to the current line of sight of the occupant. Additionally, the display control unit 304 may insert in a part of the display area of the display information a view showing the surrounding behind the vehicle comparable to a rear view provided by a rear view mirror in traditional vehicles. Provided with such display information, the occupant or driver of the vehicle can receive viewing information of the surrounding of the vehicle and, at the same time, as part of the viewing area, a rear view of the surrounding behind the vehicle. Providing such information to the viewing may increases driving safety, especially under difficult viewing conditions.

The processing of the surrounding information performed in the processing unit 302 may provide a processing emphasizing traffic lights or traffic signs such that the driver of the vehicle recognizes this information earlier and easier. This may make driving less stressfully and therefore increase driving safety.

The head-mounted display system 300 according to the embodiment shown in FIG. 3 may additionally include an audio processor or audio processing unit 306. This audio processing unit 306 is coupled with a microphone 208 and a loudspeaker 210 provided at the head-mounted display 204 via the radio frequency transceivers 214 and 206. The audio processing unit 306 is adapted to receive and process spoken language from the occupant or driver 202. This spoken language may include commands for hands free controlling the processing of the surrounding information in the processing unit 302, for example, commands as "increase contrast" or "increase brightness" for changing processing parameters of the processing unit 302. Furthermore, the spoken language may include commands controlling the display control unit 304 such as "zoom in" or "zoom out" for changing the display size of the display information. Finally, the spoken language may include commands controlling further devices of the vehicle, for example, a car radio system 308, a mobile phone 310, a cruise control unit 312, or a navigation system 314, among other devices.

In return, these devices 308, 310, 312, 314 may provide audible information via the audio processing unit 306, the transceivers 206 and 214, and the loudspeaker 210 to the occupant 202 or may provide visual information via the display control unit 304 and the head-mounted display 204 to the occupant. The audible information may include, for example, routing commands from the navigation system 314 or music and traffic information from the car radio system 308. The visible information may include routing information from the navigation system 314, or driving information, for example, the current speed of the vehicle, from the cruise control unit 312 or other devices of the vehicle. Furthermore, the display control unit 304 may receive information from the vehicle concerning the state of the vehicle, for example, operating warnings, such as an overheating warning of the engine of the vehicle or a seatbelt warning of an occupant of the vehicle not being belted in his seat. All such information may be provided as a part of the display information to the occupant or driver 202 wearing the head-mounted display 204.

When the driver of the vehicle selects the reverse gear of the vehicle, the display control unit 304 may provide a rear view as the main display information, showing the surrounding behind the vehicle to the driver 202 of the vehicle. This may make it easier for the driver to drive in reverse, for example, when parking the car, without turning his or her head and without having the sight obstructed by the C-pillars and the window frames of the vehicle.

In case the head-mounted display system detects a failure within the system, for example, if one of the sensors 102 has a defect or is obstructed, the head-mounted display 204 is set into a transparent viewing mode providing a transparent view through the head-mounted display 204 to the occupant or driver 202 of the vehicle. This may provide for safe steering and controlling of the vehicle 100, even in case of a failure of the system 300.

Moreover, the head-mounted display system 300 is not only useful for the driver of the vehicle, but also for other occupants of the vehicle. First, occupants seated on the backseats of the vehicle wearing the head-mounted display 204 can be provided with a view out of the vehicle that is not obstructed by the front passengers of the vehicle or a B-pillar of the vehicle. Furthermore, passengers of the vehicle may be provided during travel with individual video and audio information provided from a car entertainment system via the head-mounted display 204 including the loudspeaker 210. For providing display information to several occupants of the vehicle, the display control unit 304 may be adapted to provide several video streams to the several head-mounted displays 204 or several display control units 304 may be provided within the head-mounted display system 300. Accordingly, the head-mounted display system 300 may provide, with a single display, i.e., the head-mounted display 204, various information to the driver that is conventionally displayed on several displays of the vehicle. Therefore, the head-mounted display system 300 may, in addition to add vehicle safety feature, save costs for the several displays of a conventional vehicle. Such a head-mounted display system 300 can be original or supplementary incorporated in a conventional vehicle.

In summary, and according to one example of an implementation of the invention, a head-mounted display system 300 is provided that includes (i) at least one sensor 102, 104, 106, 108, 110, 112, 114 for detecting surrounding information from a surrounding, (ii) a processing unit 302 coupled with the at least one sensor 102, 104, 106, 108, 110, 112, 114 for receiving the surrounding information and processing the surrounding information, (iii) a display control unit 304 coupled with the processing unit 302 generating a display information from the processed surrounding information, the display information to be displayed to an user of the head-mounted display 204, and (iv) a head-mounted display 204 coupled to the display control unit 304 displaying the display information from the display control unit 304 to the user. The at least one sensor 102, 104, 106, 108, 110, 112, 114 may, for example, include a camera, a night vision device, a supersonic device, or a radar device providing environmental information of the surrounding of the vehicle. By presenting the user, e.g., a driver or occupant of a vehicle, the surrounding information detected by the at least one sensor 102, 104, 106, 108, 110, 112, 114, and processing the surrounding information before presenting the surrounding information as display information to the user, non-obstructed display information may be provided to the user. By displaying the display information to the user with a head-mounted display 204, the user receives a display of the display information independent of illumination conditions, especially when utilized in a vehicle 100 (FIG. 1), independent of the illumination conditions inside and outside of the vehicle 100.

According to another example of an implementation of the head-mounted display system 300, the head-mounted display 204 (FIGS. 2 & 3) includes a display incorporated into spectacles, where the display projects the display information as visual information to the user wearing the spectacles. By directly projecting the display information into the eyes of the user, a stereoscopic effect can be achieved with the head-mounted display.

According to another implementation, the processing unit 302 processing the surrounding information generates a dimmed visual output information, output information with increased contrast, output information with reduced reflections, and/or output information with increased brightness from the detected surrounding information. By processing the surrounding information as stated above, enhanced display information can be presented to the user, and especially in case of a use in a vehicle, the driving safety may be increased when driving under difficult circumstances, for examples, in case of oncoming light of oncoming cars, blinding sunlight at dusk and dawn, or when driving at foggy, rainy or snowy weather, especially at night.

Moreover, the display control unit 304 of the head-mounted display system 300 may generate display information including superposed routing information or may, in case of a use in a vehicle, generate a display information including superposed vehicle information, containing information about the speed of the vehicle or a control state of the vehicle comprising warning indications concerning the cooling water temperature, the fuel gage, the oil gage, or the like. Providing such additional display information may help to reduce the number of displays provided in a vehicle that have to be observed by the driver of a vehicle and therefore, driving safety may be increased, the number of displays may be reduced and thus, the cost for the car may also be reduced.

The head-mounted display 204 (FIGS. 2 & 3) may also include a loudspeaker 210 for outputting audible information to the user. The audible information may include indications concerning routing information or incoming phone calls or, in case of a use in a vehicle, warning hints concerning gages of the vehicle.

According to yet another example, the head-mounted display 240 may provide a transparent view, where the user can directly view the environment, as if he/she is not wearing the head-mounted display. The transparent view may be used where the head-mounted display system detects a malfunction of one of the sensors or one of the components, i.e., the processing unit or the display control unit or the head-mounted display itself. Thus, in case of a malfunction, the user is still able to detect surrounding information and, in case of a user in a vehicle, to steer the vehicle conventionally without removing the head-mounted display. Additionally, the head-mounted display may provide the transparent view only for parts of the display area of the head-mounted display achieving an augmented reality, including a combination of the processed display information and the real view directly through the head-mounted display.

Furthermore, the head-mounted display system may additionally include a line of sight sensor 212 (FIG. 2) for detecting a line of sight of the user. The display control unit 304 may then use the information from the line of sight sensor to generate display information according to the line of sight of the user. Determining the line of sight of the user and generating a display information according to this line of sight may enable the user to receive a display information as if he was looking around without wearing the head-mounted display, but without having his sight obstructed by, e.g., pillars of a vehicle, head rests, or another occupant of the vehicle and having additionally the improved display information as described above.

Also, the head-mounted display 202 may include a microphone 208 for receiving speech from the user and the head-mounted display system 300 may include an audio processing unit 306 for processing the received speech and, upon commands, included in the received speech, the audio processing unit 306 may control the processing unit 302, the display control unit 304, and other devices connected to the head-mounted system, for example a navigation system 314, a radio system 308, an entertainment system, a mobile phone 310, or a cruise control system 312 of a vehicle.

When used in a vehicle, e.g., a car or truck, by a driver or occupant of the vehicle, the sensors 102, 104, 106, 108, 110, 112, 114 of the head-mounted display system 300 may be mounted at the outside of the vehicle detecting surrounding information including the surrounding of the vehicle. This may help to provide to the user of the head-mounted display a view, which is not obstructed by pillars of the vehicle, headrests or other occupants. In this case, the head-mounted display system 300 may provide as a part of the display information in the head-mounted display 204 a rear view showing the surrounding behind the vehicle. In such an implementation, the head-mounted display system 300 could not only replaces the rear view mirrors of a conventional vehicle but also provides a rear view with the improved display information as stated above, for example, a dimmed display information or a display information with increase contrast, and provides further a rear view where death angles can be eliminated. Thus, driving safety may be increased and the cost for the rear view mirrors may be saved.

Furthermore, the head-mounted display 204 may provide the rear view as the display information when a reverse gear of the vehicle is selected. The rear view shows the surrounding behind the vehicle. A head-mounted display system like this supports the driver of the vehicle when parking the vehicle, especially when backing into a parking space. Conventionally, used parking distance control systems are no longer needed then and therefore cost for the vehicle can be reduced.

According to another implementation, the head-mounted display system may be utilized for hiking, walking or biking. In such an implementation, the sensors of the head-mounted display system are mounted at the head-mounted display detecting surrounding information including the surrounding of the user wearing the head-mounted display. This may help to provide to the user of the head-mounted display a view with additional routing and navigation information or indications for points of interest.

Figure 4:
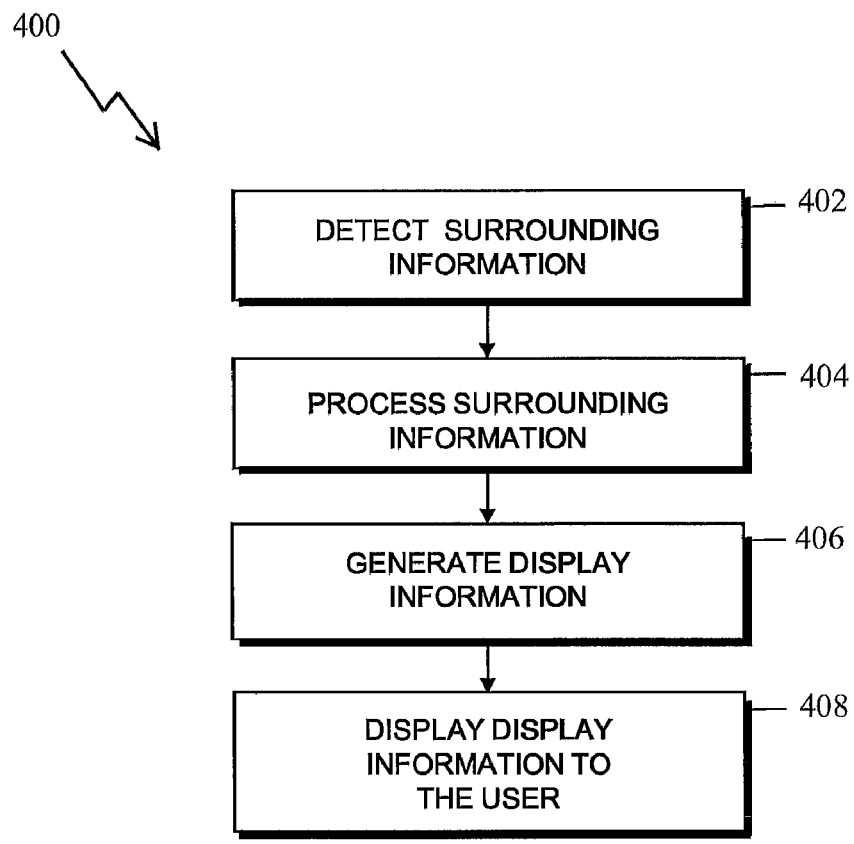
FIG. 4 is a flow chart indicating one example of the function of a display method of the head-mounted display system.

FIG. 4 is a flow chart indicating one example of the function of a display method of the head-mounted display system. At step 402, surrounding information is detected. This surrounding information may include a front view, a rear view, and side views around a user to which the display method is applied. For example, when the user is sitting in a vehicle, like a car or a truck, the surrounding information from outside the car or truck may be detected. If the user is, however, a hiker or walker, the surrounding information may be detected by sensors mounted on the head-mounted display the user is wearing.

At step 404, the detected surrounding information is processed. Such processing may include, for example, generation of the surrounding information with increased contrast, reduced reflections, increased brightness or a reduced brightness as necessary to provide improved surrounding information, as required by a user to which the display method is applied.

At step 406, display information to be displayed to a user to which the display method is applied is generated from the processed surrounding information. The display information may include, for example, one or more sections of the processed surrounding information. In one example, such display information may include a combination of a front view and a rear view where the rear view represents only a small portion of the display information and the front view represents the main portion of the display information. Furthermore, the display information may include additional information, for example, routing information from a navigation system indicating a route to be followed by the user as a red line superimposed to the surrounding information, or indications for points of interest indicating for example restaurants, museums, theaters and so on when walking in a city, or indicating points of interest, for example, names of a mountain or a hill included in the surrounding information to a user hiking through the mountains. Finally, at step 408, the display information is displayed to the user via a head-mounted display as described above in connections with FIGS. 2 & 3. In another example method, the display method 400 may further include detecting the line of sight of a user and a generation of display information according to the detected line of sight.

In summary, the display method includes detecting surrounding information, processing the detected surrounding information, generating display information which is to be displayed to a user, where the display information is generated from the processed surrounding information, and displaying the display information to the user via a head-mounted display. By using this display method e.g., in a vehicle like a car or truck to provide the occupant or driver of the vehicle with a pre-processed display information of the surrounding of the vehicle, the driving safety may be improved, and by using the head-mounted display as the only display for the driver of the vehicle, a lot of conventionally utilized displays, for example, a display of an instrument panel of the vehicle, a navigation system, a car radio system, a car entertainment system or a mobile phone may be replaced by the head-mounted display and therefore cost for manufacturing of the car may be reduced.

According to another implementation, the processing of the detected surrounding information and the generation of the display information may be controlled by commands spoken by the user. This may enable the user to adapt the display information as desired without the need to use any tactile input devices and simplify the use of the head-mounted display.

The processing of the detected surrounding information and the generation of the display information may further include the generation of dimmed visual output information, output information with increased contrast, output information with reduced reflections, and/or output with increased brightness. Any combinations of these output information generation may be possible, which may assist a user of a vehicle with driving safety under difficult driving circumstances.

Furthermore, if used in a vehicle, the display method may include the generation of display information that includes superposed driving information, superposed vehicle information, a rear view showing the surrounding behind the vehicle as a part of the display information, and/or a rear view showing the surrounding behind the vehicle when the reverse gear of the vehicle is selected. This may provide the driver of the vehicle with additional information when steering the vehicle and, at the same time, he can pay full attention to the traffic in the direction in which he is driving. Additionally, this may provide the opportunity to omit or minimize displays currently utilized in conventional vehicles, for example a tachometer, a display of a navigation system or the like and rear view mirrors of a conventional vehicle.

It will be understood, and is appreciated by persons skilled in the art, that one or more processes, sub-processes, or process steps described in connection with FIGS. 1-4 may be performed by hardware and/or software. If the process is performed by software, the software may reside in software memory (not shown) in a suitable electronic processing component or system such as, one or more of the functional components or modules schematically depicted in FIGS. 1 & 3. The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any means that may contain, store or communicate the program for use by or in connection with the instruction execution system, apparatus, or device. The computer readable medium may selectively be, for example, but is not limited to, an electronic, magnetic, optical, electromagnetic, infrared, or semiconductor system, apparatus or device. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The foregoing description of implementations has been presented for purposes of illustration and description. It is not exhaustive and does not limit the claimed inventions to the precise form disclosed. Modifications and variations are possible in light of the above description or may be acquired from practicing the invention. For example, any of the above described implementations may be combined with each other without departing from the scope of the invention. The claims and their equivalents define the scope of the invention.

What is claimed is:

1. A head-mounted display system, comprising:
   at least one camera for capturing visual display information;
   at least one sensor detecting surrounding information, where the at least one sensor detects relative change in ambient light intensity;
   a processing unit processing the visual display information received from the camera and altering the brightness and/or contrast of the visual display information based on the relative change in ambient light intensity detected by the at least one sensor;
   a display control unit generating visual display information to be displayed to a user of the system from the processed visual display information received from the processing unit; and
   a head-mounted display displaying the visual display information wirelessly received from the display control unit to the user.

2. The head-mounted display system of claim 1, where the head-mounted display comprises a display incorporated into spectacles, the display projecting the visual display information as visual information to the user wearing the spectacles.

3. The head-mounted display system of claim 1, where the processing of the processing unit comprises a generation of a dimmed visual output information from the detected surrounding information.

4. The head-mounted display system of claim 1, where the processing of the processing unit comprises a generation of a visual output information with increased contrast from the detected surrounding information.

5. The head-mounted display system of claim. 1, where the processing of the processing unit comprises a generation of a visual output information with reduced reflections from the detected surrounding information.

6. The head-mounted display system of claim 1, where the processing of the processing unit comprises a generation of a visual output information with increased brightness from the detected surrounding information.

7. The head-mounted display system of claim 1, where the display control unit generates the visual display information comprising a superimposed routing information.

8. The head-mounted display system of claim 1, where the head-mounted display comprises a loudspeaker for outputting audible information to the occupant.

9. The head-mounted display system of claim 1, where the head-mounted display provides a transparent view.

10. The head-mounted display system of claim 1, where the head-mounted display system comprises furthermore a line of sight sensor, detecting a line of sight of an user of the system, the display control unit connected to the line of sight sensor generates a visual display information according the line of sight.

11. The head-mounted display system of claim 1, where the head-mounted display comprises a microphone receiving speech from the user and the head-mounted display system comprises an audio processing unit processing the received speech, upon commands comprised in the received speech the audio processing unit controls the processing unit and/or the display control unit.

12. The head-mounted display system of claim 11, where upon commands comprised in the received speech the audio processing unit controls further devices, the further devices comprising a navigation system, a car radio system, a mobile music system, a car entertainment system, a mobile entertainment system, a mobile phone, and/or a cruise control system.

13. The head-mounted display system of claim 1, where the head-mounted display system is used in a vehicle by a driver or occupant of the vehicle, and the at least one camera and the at least one sensor are mounted at the vehicle, the at least one camera capturing visual display information and the at least one sensor detecting surrounding information comprising the surrounding of the vehicle.

14. The head-mounted display system of claim 13, where the display control unit generates the visual display information comprising a superimposed vehicle information.

15. The head-mounted display system of claim 13, where the head-mounted display provides in a part of the visual display information a rear view showing the surrounding behind the vehicle.

16. The head-mounted display system of claim 13, where the head-mounted display provides a rear view as the visual display information showing the surrounding behind the vehicle in case a reverse gear of the vehicle is selected.

17. The head-mounted display system of claim 1, where the at least one camera and the at least one sensor are mounted at the head-mounted display, the at least one camera capturing visual display information and the at least one sensor detecting surrounding information comprising the surrounding of the user wearing the head-mounted display.

18. A display method, comprising:
capturing visual display information;
detecting surrounding information and relative change in ambient light intensity;
processing the visual display information;
generating visual display information to be displayed to a user from the processed visual display information, where the brightness and/or contrast of the visual display information is altered based on the relative change in ambient light intensity;
transmitting the visual display information wirelessly to a head-mounted display; and
displaying the visual display information to the user via the head-mounted display.

19. The display method of claim 18, where the head-mounted display comprises a display incorporated into spectacles, the display projecting the visual display information as visual information to the user wearing the spectacles.

20. The display method of claim 19, where the processing of the detected surrounding information and generating of the visual display information is controlled by commands spoken by the user.

21. The display method of claim 18, where the processing comprises a generation of a dimmed visual output information from the detected surrounding information.

22. The display method of claim 18, where the processing comprises a generation of a visual output information with increased contrast from the detected surrounding information.

23. The display method of claim 18, where the processing comprises a generation of a visual output information with reduced reflections from the detected surrounding information.

24. The display method of claim 18, where the processing comprises a generation of a visual output information with increased brightness from the detected surrounding information.

25. The display method of claim 18, where the display information comprises superimposed routing information.

26. The display method of claim 18, furthermore detecting a line of sight of the user, where visual display information is generated according to the line of sight.

27. The display method of claim 18, where the display method is used in a vehicle, where:
the captured visual display information and the detected surrounding information compromise the surrounding of the vehicle; and
the visual display information is displayed to an occupant or driver of the vehicle via a head-mounted display.

28. The display method of claim 27, where the visual display information comprises a superimposed vehicle information.

29. The display method of claim 27, where a part of the visual display information provides a rear view showing the surrounding behind the vehicle.

30. The display method of claim 27, where the visual display information comprises a rear view showing the surrounding behind the vehicle in case a reverse gear of the vehicle is selected.

* * * * *

UNITED STATES PATENT AND TRADEMARK OFFICE
CERTIFICATE OF CORRECTION

| | |
|---|---|
| PATENT NO. | : 7,924,506 B2 |
| APPLICATION NO. | : 12/118661 |
| DATED | : April 12, 2011 |
| INVENTOR(S) | : Rieger |

It is certified that error appears in the above-identified patent and that said Letters Patent is hereby corrected as shown below:

At column 8, line 17, "...a display method of the head-mounted display system." should be changed to --...a display method 400 of the head-mounted display system.--

At column 10, line 50, claim 5, "The head-mounted display system of claim. 1,..." should be changed to --The head-mounted display system of claim 1,...--

At column 10, line 60, claim 7, "comprising a superimposed routing information." should be changed to --comprising superimposed routing information.--

At column 11, line 1, claim 10, "...a line of sight of an user..." should be changed to --...a line of sight of a user...--

At column 11, line 3, claim 10, "sensor generates a visual display information..." should be changed to --sensor generates visual display information...--

At column 11, line 27, claim 14, "...comprising a superimposed vehicle information." should be changed to --...comprising superimposed vehicle information.--

At column 12, line 36, claim 27, "surrounding information compromise..." should be changed to --surrounding information comprise...--

At column 12, line 41, claim 28, "display information comprises a superimposed..." should be changed to --display information comprises superimposed...--

Signed and Sealed this
Eighteenth Day of October, 2011

David J. Kappos
*Director of the United States Patent and Trademark Office*